United States Patent [19]

Yoshikawa et al.

[11] 4,134,952
[45] Jan. 16, 1979

[54] METHOD AND DIE FOR FORMING LAMINATED TUBULAR STRUCTURES OF SYNTHETIC RESINS

[75] Inventors: Shinsuke Yoshikawa; Yuji Sawa; Sigeru Endo, all of Iwaki, Japan

[73] Assignee: Kureha Kagaku Kogyo Kabushiki Kaisha, Tokyo, Japan

[21] Appl. No.: 791,148

[22] Filed: Apr. 26, 1977

[30] Foreign Application Priority Data

Apr. 26, 1976 [JP] Japan ............................ 51-46505

[51] Int. Cl.² .......................................... B29D 23/04
[52] U.S. Cl. ............................... 264/173; 264/209; 425/133.1; 425/326.1
[58] Field of Search ............ 264/173, 171, 95, 209; 425/133.1, 326.1

[56] References Cited

U.S. PATENT DOCUMENTS

| | | | |
|---|---|---|---|
| 3,023,461 | 3/1962 | Sherman | 264/173 |
| 3,457,337 | 7/1969 | Turner | 264/173 |
| 3,546,743 | 12/1970 | Roth | 425/133.1 |
| 3,694,292 | 9/1972 | Schippers | 425/133.1 |
| 3,707,590 | 12/1972 | Wiggins et al. | 264/173 |
| 3,819,792 | 6/1974 | Ono et al. | 264/173 |
| 3,962,396 | 6/1976 | Ono et al. | 264/173 |

Primary Examiner—Jeffery R. Thurlow
Attorney, Agent, or Firm—Wenderoth, Lind & Ponack

[57] ABSTRACT

Molten first and second resins are directed to flow in a two-layer and confluent state along a tubular passage formed between a torpedo and a die structure from the nose tip of the torpedo and then along a divergently expanding path along the conical nose of the torpedo respectively as the outer and inner layers, which are thus rendered into uniform thin layers and then extruded from the die as a two-layer laminated tubular structure. A third molten resin may be similarly rendered into a thin tubular layer by forcing it to flow through another tubular passage formed between another torpedo and the inner wall surface formed by a cavity within the first torpedo and directing this third resin to confluently join the layers of the first and second molten resins on the inner side thereof thereby to produce a three-layer laminated tubular structure.

10 Claims, 5 Drawing Figures

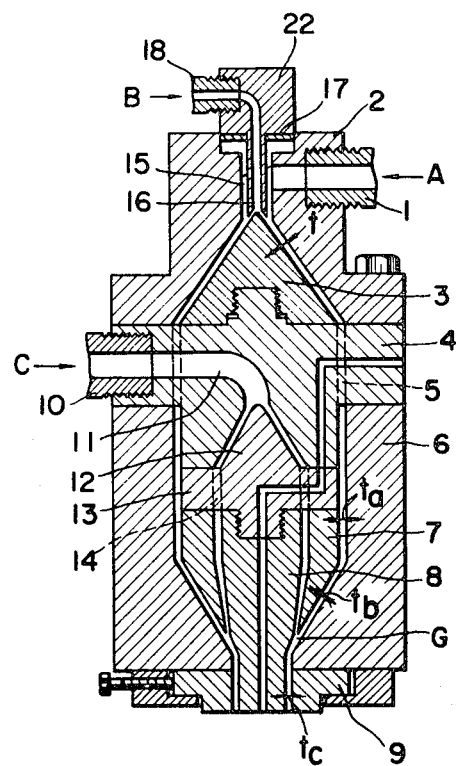
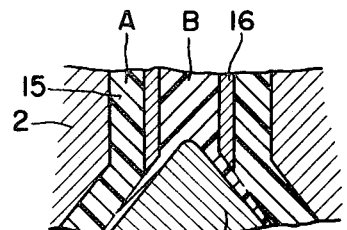
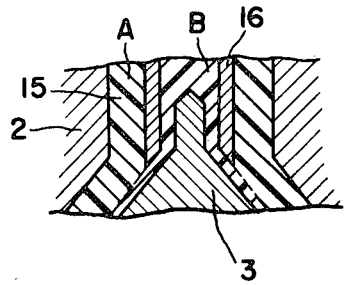
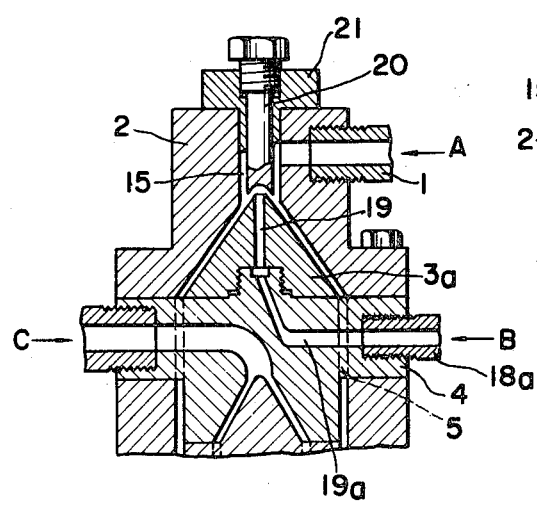
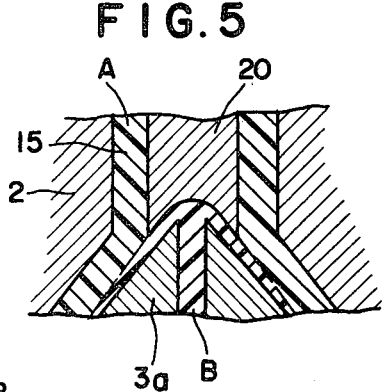

METHOD AND DIE FOR FORMING LAMINATED TUBULAR STRUCTURES OF SYNTHETIC RESINS

BACKGROUND OF THE INVENTION

This invention relates generally to techniques of producing composite or laminated structures of synthetic resins. More particularly, the invention relates to a method and die construction for forming a composite or laminated tubular structure by efficiently bonding together a plurality of molten thermoplastic synthetic resin materials within a die.

In recent years, there has been continuing progress in the laminating of a wide variety of plastic materials in order to effectively utilize the characteristics of the resins and to produce better packaging materials, and processes for forming tubular laminated structures by compositing melt extruded resins within dies are being widely practiced. The majority of the laminating dies for this purpose are of a construction wherein, a first resin is caused to flow past a cross head part or the arm part of a spider die to be formed into a tubular structure, and thereafter a second resin from the outside or from within a core is caused to merge in a tubular state with the tubular structure of the first resin thereby to form a laminated tubular structure.

The production of tubular structures in this manner is accompanied by the problem of obtaining a uniform flow of thin layers of resins and the problem of adhesiveness between adjacent layers. For solving the former problem, various proposals have been made to provide the die with the capability of adjusting deviations in layer thickness for each layer in order to render the thickness of each layer uniform, but with respect to the layer thickness, there is a natural limit to the mechanical working precision. For improving the adhesiveness between adjacent resin layers in order to solve the latter problem, this can be accomplished by appropriately selecting the resin materials, but there is a natural limit to the range of materials. Alternatively, various proposals for admixing other resins for the purpose of improving the adhesiveness have been made, but such measures give rise to other problems such as impairment of transparency and increasing of the oxygen permeability, whereby the original desirable properties of the resins are lost.

In contrast to these measures, the insertion of a separate adhesive layer between adjacent layers is effective. In this case, however, by the ordinarily used method described hereinbefore, the die construction becomes complicated, and, although the insertion of a thin adhesive layer in a uniform manner is required, this is difficult, the layer becoming unnecessarily thick. As a consequence, there arise further problems such as a lowering of the adhesiveness between adjacent layers and impairment of transparency.

SUMMARY OF THE INVENTION

It is an object of this invention to provide a highly effective method and means for uniformly inserting a thin adhesive layer between adjacent layers of a laminated structure during the forming thereof, the means being of simple construction. Thus, this invention solves the problems described above and provides an industrially feasible and effective method and means for producing laminated tubular structures.

According to this invention in one aspect thereof, briefly summarized, there is provided a method of forming a laminated tubular structure characterized by the steps of: forcing and directing molten first and second resins to flow simultaneously in a two-layer and confluent state along a tubular passage formed between a torpedo and a die structure from an upstream nose tip of the torpedo and then along a divergently expanding path along the conical nose of the torpedo in a two-layer tubular state respectively as the outer and inner layers, thereby being rendered into uniform thin layers; extruding the confluent layers through annular lips of the die downstream from the torpedo thereby to form a two-layer laminated tubular structure; and, if necessary, simultaneously directing a molten third resin to flow in tubular form to confluently join the two-layer tubular flow of the first and second resins on the inner side thereof at a point upstream from said lips and extruding the resulting three confluent layers through the lips of the die thereby to form a three-layer laminated tubular structure.

According to this invention in another aspect thereof, briefly summarized, there is provided a die for extruding laminated tubular structures of resins characterized by an outer die structure having a cavity therewithin and a torpedo having a substantially conical nose with a nose tip and so disposed in said cavity as to form between the torpedo and the inner wall surface formed by the cavity a tubular first passage, the die structure having therein a second passage communicating with and extending from a first resin supply pipe outside of the die to said nose tip of the torpedo and functioning to conduct a molten first resin under pressure from the supply pipe to the nose tip, the die having therein a third passage communicating with and extending from a second resin supply pipe outside of the die to the nose tip and functioning to conduct a molten second resin under pressure from the second resin supply pipe to the nose tip at a position nearer the torpedo nose than the first resin, the first and second resins thereby being forced to flow confluently in a two-layer tubular state through the tubular first passage and constituting outer and inner layers, the first and second layers thereby being rendered into uniform thin layers to be extruded out of the die as a two-layer laminated tubular structure through annular lips of the die contiguous to the other, downstream end of the tubular passage, the die being optionally provided therein with a fifth passage communicating with and extending from a third resin supply pipe outside of the die to the upstream end of a tubular fourth passage formed between the outer surface of a second torpedo and the inner wall surface formed by another cavity within the first torpedo and joining, at the downstream end thereof, the tubular first passage at an annular confluence part near the downstream end thereof, the fifth passage and the tubular fourth passage functioning to conduct a molten third resin under pressure from the third resin supply pipe to the confluence part thereby to force the third resin as a thin tubular layer to confluently and laminarly join the second resin layer to form a three-layer resin flow to be extruded through annular lips of the die as a three-layer laminated tubular structure.

The nature, utility, and further features of this invention will be apparent from the following detailed description beginning with a consideration of general aspects of the invention and concluding with specific examples of practice illustrating preferred embodiments of the invention.

BRIEF DESCRIPTION OF THE DRAWINGS

In the drawing:

FIG. 1 is a side view, in longitudinal section, showing one example of a die for extruding laminated tubular structures according to this invention;

FIG. 2 is an enlarged, fragmentary side view showing in detail the parts in the vicinity of the tip of the first torpedo in the die shown in FIG. 1;

FIG. 3 is a view similar to FIG. 2 showing in detail a modification of the parts shown in FIG. 2;

FIG. 4 is a side view, in longitudinal section, showing another example of a die according to the invention; and FIG. 5 is a view similar to FIGS. 2 and 3 showing parts in the vicinity of the tip of the first torpedo in the die shown in FIG. 4.

DETAILED DESCRIPTION

In the development of this invention, we made laminated tubular structures by introducing a colored molten resin B as an adhesive layer for a resin A layer from the nose tip of a torpedo in a die and, further making bottles by blow molding, studied the effect of the quantity of the resin B inserted and the mutual relationship thereof with the viscosity. As a result, we made the following discoveries.

1. Bottles of varied thicknesses of the resin B layer having viscosities within a certain range were made and the adhesive strengths between the resin B layer and the resin A layer (resistances to peeling) in the 180-degree direction were measured. As a result, it was found that, surprisingly, while the adhesive strength for a width of 1 cm. was approximately 30 grams (g.) for thicknesses of the resin B layer of 5 to 10 microns, it increased to approximately 200 g. when the thickness became 1 to 2 microns. That is, it was confirmed that reducing the thickness of the resin B layer is extremely effective.

2. Furthermore, judging from the states of coloring of articles formed by the method and die of this invention, the introduction of the resin B layer was extremely uniform. This result may be attributed to the nature of the confluent flow of the two resins as follows. Even when the thickness of the resin B layer flowing from the tip of the torpedo is somewhat nonuniform, as the two resins of respectively different viscosities flow along the divergent conically inclined surface of the torpedo expanding downward, the resin B tends to spread uniformly during its flow as a consequence of its expanding flow path and its action against the wall surface of the torpedo in the case where its viscosity is equal to or less than that of the resin A and its thickness is less than that of the resin A.

The above described results also indicate that the interposition of a thin adhesive layer uniformly between other layers is extremely important for increasing the adhesive effect between layers and that the insertion of an adhesive layer from the nose tip of the torpedo according to this invention is highly effective.

This invention, of course, is not limited to merely the interposition of a resin as an adhesive layer. This invention is highly effective also for uniformly inserting a resin having an extremely unique characteristic as, for example, a resin which exhibits ample effectiveness even as a relatively thin layer and has a low oxygen permeability.

The manner in which the above described features of the invention are achieved will be apparent from the following detailed description of specific examples of the method and die according to this invention.

Reference is first made to FIG. 1, which is a longitudinal section of a laminating die of a spider system embodying this invention for inserting an adhesive between resin layers. A first resin A melted in an extruder (not shown) is introduced into the die through an inlet pipe 1 and, caused to assume a cylindrical flow by a cylindrical passage 15 to the vicinity of the nose tip of a torpedo 3 with a conical nose, flows downward and divergently through an expanding path formed between the conical nose of the torpedo 3 and the concavely conical inner wall surface of an adapter 2 secured coaxially on a spider 4, which in turn is secured coaxially on an adapter 6. The resin A flows further past a arm part 5 of the spider 4 and passes through a cylindrical passage between the inner wall surface of the adapter 6 and the outer surface of a mandrel 7 disposed coaxially within the adapter 6 and constituting a coaxial path of the torpedo 3. The resin A finally flows out of the die through an annular orifice formed between a core 8 and a ring 9.

A second resin C melted in a separate extruder (not shown) is introduced into the die through an inlet pipe 10, passes through a passage 11 formed in the arm part 5 of the spider 4 to be conducted into the central part, is spread divergently by a second torpedo 12 secured to a separate spider 13, flows past an arm part 14, and, flowing between the mandrel 7 and the core 8, becomes confluent with the resin A at a point G whereby the resulting laminated tubular structure of resins A and C flows out of the die through the orifice formed between the core 8 and the ring 9.

In a laminating die of a spider system of this character, the adhesiveness between the layers of the resins A and C can be increased by uniformly inserting a thin layer of a material for imparting adhesion between these layers. In accordance with the instant embodiment of this invention, for this insertion of the adhesion imparting thin layer, a resin introducing tube 16 is disposed to extend downward coaxially with and through the aforementioned passage 15 for passing the resin A, the lower end of the tube 16 coaxially facing the vertex tip of the torpedo 3 in close proximity thereto. The upper end of the tube 16 is connected to inlet pipe 18. This introducing tube 16 can be adjusted in vertical position relative to the torpedo 3 by appropriately selecting the thickness of a spacer 17 interposed between a fitting member 22, into which the end of the inlet pipe 18 is screwed, and the top part of the adapter 2.

A third resin B melted by still another extruder or a melting device (not shown) is fed at a constant flow rate by means such as a gear pump (not shown) through the inlet pipe 18 and, passing through the introducing tube 16, flows against the tip of the torpedo 3 to become confluent with the flow of the resin A. This confluence of the flows of the resins A and B is shown in detail in the enlarged sectional view in FIG. 2. The extreme tip of the torpedo 3 may be modified as shown in FIG. 3 so as to assure uniform flow of the resin B with respect to the torpedo 3.

The resins A and B caused to meet in confluence in this manner are caused to diverge along the conical surface of the torpedo 3 expanding divergently downward. During this flow, the layer of the resin B is particularly thin, and when this resin B is so selected that its viscosity in molten state is equal to or lower than that of the resin A, it diverges uniformly as a result of the action between it and the outer wall surface of the torpedo 3. Then, as this confluent flow passes the arm 5 of the spider 4 and reaches the point G, the layer of the resin B and the layer of the resin C come into direct contact and become confluent, whereby a composite tubular structure of three layers is formed and extruded out of the lip of the die. Thus, the outer resin layer A and inner resin layer C are strongly bonded together by the thin resin B layer interposed therebetween. The thicknesses t at the conical part or forward nose tip of the torpedo or at the divergent or flaring path of the resin flow, $t_a$ at the land part of the torpedo, $t_b$ at the convergent path of the resin flow, and $t_c$ at the die lips, may be the same or different from each other, but are all in the range of 0.5–10mm.

In another and effective embodiment of this invention as illustrated in FIG. 4, the resin B is fed upward to the nose tip of the upper torpedo 3a through a passage 19 formed through the center of the torpedo 3a to an open upper end at the tip thereof and communicating at its lower end to a passage 19a formed in the arm part 5 of the spider 4. The outer end of the passage 19a communicates with the end of an inlet pipe 18a screwed into the arm part 5. Furthermore, a guide rod 20 is disposed coaxially within the passage 15 for the resin A and extends downward to a lower or inner end positioned in the proximity of the tip of the torpedo 3a and having a concavely recessed end face. This guide rod 20 has at its upper or outer end a bolt head which can be turned from outside of the die and, below this bolt head, is a screw engaged with a cap member 21 fixed to the top of the adapter 2. Thus, by turning this guide rod 20, the gap between its lower end and the tip of the torpedo 3a can be finely adjusted.

By the above described construction, the molten resin B introduced under pressure through the inlet pipe 18a flows through the passage 19a and upward through the passage 19 to emerge from the nose tip of the torpedo 3a and be deflected by the inner recessed end of the guide rod 20 to change its direction of flow. The resin B is thereby guided to flow divergently between this lower end of the guide rod 20 and the nose tip part of the torpedo 3a, merging confluently with the flow of the resin A as shown in detail in FIG. 5. The confluent flow of these resins A and B and the subsequent confluence thereof with the flow of the resin C are the same as those described hereinabove with respect to the preceding embodiment of the invention.

While, in the foregoing disclosure, this invention was described with respect to means for inserting a thin layer for imparting adhesiveness between two tubular layers thereby to form a tubular structure of three layers or plies, it is also readily possible, by combining the means shown in FIGS. 1, 2, and 3 and the means shown in FIGS. 4 and 5, to interpose adhesive layers, simultaneously or separately, between adjacent layers of a tubular structure of three resin layers, thereby to produce a five-layer tubular structure.

Accordingly, this invention is not limited to the constructions described above and illustrated in the drawings. Furthermore, the inserted layer or layers are not merely adhesive layers, the principle of the invention being applicable to a wide range of production techniques.

We claim:

1. A method of forming a laminated tubular structure which comprises: forcing and directing molten first and second resins to flow through respectively separate paths to the forward nose tip of a torpedo so disposed within a cavity within a die structure as to form a tubular first passage between said torpedo and the inner wall surface formed by said cavity, said torpedo having a substantially conical nose; directing said resins to merge at said forward nose tip and then flow confluently in a two-layer tubular state through said tubular first passage, said first and second resins respectively constituting the outer and inner layers of the two-layer tubular structure, said first and second resins in said two-layer tubular state, thus being forced initially to flow in a divergently expanding path along the outside of said conical nose of said torpedo toward the middle of the outside of said torpedo, thereby being rendered into uniform thin layers, and then to flow from the middle of the outside of said torpedo toward the other, downstream end of said torpedo; and extruding said thin layers, in said two-layer tubular state, through annular lips of said die structure downstream from the torpedo, thereby to form a two-layer laminated, tubular structure.

2. A method of forming a laminated tubular structure as claimed in claim 1 which further comprises simultaneously directing a molten third resin to flow in tubular form to confluently join the two-layer tubular flow of the first and second resins on the inner side thereof at a point upstream from said lips, and extruding the resulting three confluent layers through the lips of the die thereby to form a three-layer laminated tubular structure.

3. A method of forming a laminated tubular structure as claimed in claim 1 in which said separate path of flow of the molten second resin in the part thereof approaching the nose tip of the torpedo is formed by the bore of a pipe which, in the vicinity of the nose tip, is straight and coaxially aligned with the torpedo centerline and has a discharge end opening directed toward the nose tip in close proximity thereto, whereby the second resin flowing out of said discharge end opening impinges on the nose tip of the torpedo and is thus caused to flow in a divergent spreading path along and in contact with the conical surface of the torpedo, and the separate path of flow of the molten first resin in the part thereof approaching the nose tip is a straight passage of annular cross section, formed between the outer surface of said pipe and the inner wall surface formed by a hole bored through a part of the die structure, and has an annular discharge opening disposed in the proximity of the discharge end opening of the pipe and joining contiguously and smoothly the upstream end of said tubular first passage, whereby the first resin flowing out of said annular discharge opening flows against the second resin which has begun to flow in the divergent spreading path, thereby to merge and flow confluently therewith.

4. A method of forming a laminated tubular structure as claimed in claim 1 in which said separate path of flow of the molten second resin in the part thereof approaching the nose tip of the torpedo is a straight hole bored in the torpedo nose coaxially with the torpedo centerline and having a discharge opening at the nose tip, a guide rod being adjustably disposed in coaxial alignment with the torpedo centerline and having a concavely recessed end face confronting said discharge opening in close proximity thereof, whereby the second resin flowing out of the discharge opening impinges against the recessed end face to be acutely reflexed in flow direction and thus caused to flow in a divergent spreading path along and in contact with the conical surface of the torpedo, and the separate path of flow of the molten first resin in the part thereof approaching the nose tip is a straight passage of annular cross section, formed between the outer surface of said guide rod and the inner wall surface formed by a hole bored through a part of the die structure, and has an annular discharge opening formed by and at the recessed end of the guide rod and joining contiguously and smoothly the upstream end of said tubular first passage, whereby the first resin flowing out of said annular discharge opening flows against the second resin which has begun to flow in the divergent spreading path, thereby to merge and flow confluently therewith.

5. A die for extruding laminated tubular resinous structures, comprising an outer die structure having a cavity therewithin and a torpedo having a substantially conical nose with a nose tip at the forward, upstream end thereof and so disposed in said cavity as to form a tubular first passage between said torpedo and the inner wall surface formed by said cavity, the outer die structure having therein a second passage communicating with and extending from a first resin supply pipe outside of the die to said nose tip and functioning to conduct a molten first resin under pressure from the supply pipe to the nose tip, the die having therein a third passage communicating with and extending from a second resin supply pipe outside of the die to the nose tip and functioning to conduct a molten second resin under pressure from the second resin supply pipe to the nose tip at a position nearer the torpedo than the first resin, the second and third passages being coaxial to each other in the vicinity of the nose tip, the first and second resins thereby being forced to flow confluently in a two-layer tubular state through the tubular first passage to respectively constitute outer and inner layers, the layers of the first and second resins thus being forced initially to flow in a divergently expanding path along the conical nose of the torpedo, thereby being rendered into uniform thin layers to be extruded out of the die as a two-layer laminated tubular structure through annular lips of the die contiguous to the downstream end of the tubular first passage.

6. A die for extruding laminated tubular resinous structures as claimed in claim 5 in which the die is provided therein with a second torpedo disposed within a cavity within the first torpedo thereby to form a tubular fourth passage having an upstream end at the nose tip of the second torpedo, and with a fifth passage communicating with and extending from a third resin supply pipe outside of the die to said upstream end of the tubular fourth passage, which tubular fourth passage joins, at the downstream end thereof, the tubular first passage at a juncture near the downstream end of the tubular first passage, the fifth passage and the tubular fourth passage functioning to conduct a molten third resin under pressure from the third resin supply pipe to said juncture thereby to force the third resin, as a thin tubular layer, to join confluently and laminarly the second resin layer to form a three-layer resin flow to be extruded through the annular lips of the die as a three-layer laminated tubular structure.

7. A die for extruding laminated tubular resinous structures as claimed in claim 5 in which the second passage, at a portion thereof in the vicinity of the nose tip of the torpedo, is a straight-line passage formed in the outer die structure and coaxially aligned with the torpedo centerline, and the third passage, at a portion thereof in the vicinity of the nose tip of the torpedo, is the inner bore of a straight pipe disposed coaxially within said straight-line passage, the diameter of the straight-line passage being greater than the outer diameter of the pipe.

8. A die for extruding laminated tubular resinous structures as claimed in claim 5 in which the second passage, at a portion thereof in the vicinity of the nose tip of the torpedo, is a straight-line passage formed in the outer die structure and coaxially aligned with the torpedo centerline, and the third passage, at a portion thereof in the vicinity of the second resin supply pipe, is formed in the outer die structure, and at a portion thereof in the vicinity of the nose tip of the torpedo, is formed in the torpedo as a straight-line passage coaxial with the centerline of the torpedo and having a discharge opening at the nose tip, there being a guide rod which is screw engaged with and supported by a part of the die structure, disposed coaxially within said straight-line passage of the second passage, said guide rod having an outer end rotatable from outside of the die and an inner concavely recessed end disposed near and facing the discharge opening of said straight-line passage of the third passage, the diameter of the straight-line passage of the second passage being greater than the diameter of the guide rod.

9. A die for extruding laminated tubular resinous structures as claimed in claim 6 in which: the second passage, at a portion thereof in the vicinity of the nose tip of the first torpedo, is a straight-line passage formed in the die structure and coaxially aligned with the centerline of the first torpedo; the third passage, at a portion thereof in the vicinity of the nose tip of the first torpedo, is the inner bore of a straight pipe disposed coaxially within said straight-line passage, the diameter of said straight-line passage being greater than the outer diameter of the pipe; and the fifth passage, in a portion thereof communicating with the third resin supply pipe, is formed in the die structure, and in a portion thereof in the vicinity of the tubular fourth passage, is formed in the first torpedo to communicatively join the tubular fourth passage at the nose tip of the second torpedo.

10. A die for extruding laminated tubular resinous structures as claimed in claim 6 in which: the second passage, at a portion thereof in the vicinity of the nose tip of the first torpedo, is a straight-line passage formed in the die structure and coaxially aligned with the centerline of the first torpedo; the third passage, at a portion thereof in the vicinity of the second resin supply pipe, is formed in the die structure, and at a portion thereof in the vicinity of the nose tip of the first torpedo, is formed in the first torpedo as a straight-line passage coaxial with the centerline of the first torpedo and having a discharge opening at the nose tip of the first torpedo, there being a guide rod, which is screw engaged with and supported by a part of the die structure, disposed coaxially within said straight-line passage of the second passage, said guide rod having an outer end rotatable from outside of the die and an inner concavely recessed end disposed near and facing the discharge opening of said straight-line passage of the third passage, the diameter of the straight-line passage of the second passage being greater than the diameter of the guide rod; and the fifth passage, in a portion thereof communicating with the third resin supply pipe, is formed in the die structure, and in a portion thereof in the vicinity of the tubular fourth passage, is formed in the first torpedo to communicatively join the tubular fourth passage at the nose tip of the second torpedo.

* * * * *